Patented Dec. 12, 1950

2,533,304

UNITED STATES PATENT OFFICE 2,533,304

PREVENTION OF RUST

Franklin M. Watkins, Flossmoor, Ill., assignor to Sinclair Refining Company, New York, N. Y., a corporation of Maine No Drawing. Application October 28, 1947, Serial No. 782,696

4 Claims. (Cl. 44—76)

My invention is concerned with a method for preventing or retarding rusting, especially rusting due to water dissolved or entrained in or settled from petroleum oils, including especially gasoline, kerosene and fuel oils. The method is particularly valuable as applied to prevent rusting in pipe lines.

Rust frequently occurs in pipe lines, storage tanks, etc. and even in automotive and similar equipment because of traces of moisture inevitably present in the fuel or lubricant. Gasoline and kerosene, for example, as they leave the refinery are usually free of occluded moisture but they may contain as much as 0.005–0.01% dissolved moisture. Part of this dissolved moisture separates when the oil is chilled in a storage tank, for instance, and settles as a separate liquid phase beneath the main body of the oil.

Water may also enter oil handling systems along with air through partially filled tanks provided with breather devices. As such a tank cools, for example at night, the contents contract and air laden with moisture enters. This moisture condenses on the walls of the tank, settles to the bottom and dried air is expelled when the contents of the tank again warm up as from the heat of the sun the next day. As will be readily appreciated, repetition of this cycle eventually leaves appreciable amounts of water at the bottom of the tank.

Although several methods have been proposed for preventing rusting in product handling systems, each of these has rather obvious shortcomings. One method, for example, involves drying of the product, as gasoline, by absorption on dehydrated alumina before the product is pumped into pipe lines. Another method involves the introduction into the product of costly chemicals such as hydrogen or mercaptobenzothiazole which react with dissolved oxygen and thereby arrest corrosion. Still another method involves the introduction of water soluble corrosion inhibitors such as sodium nitrite or chromates. Each of these methods is disadvantageous as affording only temporary protection. Sodium nitrite applied to inhibit rusting in pipe lines is frequently decomposed by the action of oxdizing agents present in some crude oils. Hydrogen is quickly lost from vented storage tanks while water soluble inhibitors are lost when they settle to the bottom of storage tanks and are drawn off. Completely water soluble inhibitors are further deficient in many instances in not affording protection in the oil phase.

The rust-inhibiting agent employed in the practice of my invention is inexpensive and readily prepared, is difficult to decompose and provides a high degree of protection in both the oil phase and aqueous phase. Moreover, it is effective in extremely small proportions and over a wide range of temperatures.

The agent to which I refer is triamylamine mahogany sulfonate. This material is produced by reacting a sulfuric acid-treated petroleum oil of lubricating oil viscosity and triamylamine, which itself is readily produced by any one of several standard procedures well known in the art. In the reaction with the sulfuric acid-treated petroleum oil, the triamylamine is best used in approximately the quantity called for by theory as determined by the acid number of the acid oil. A typical preparation of the amine sulfonate involves the use of an acid oil having a gravity °API of 29.4, a density Saybolt of 205 seconds and 47.2 seconds at 100° F. and 210° F., respectively, and an acid number of 13.4. In a small scale run 100 grams of the acid oil containing .0275 mole of sulfonic acids and 6.25 grams of triamylamine are heated at a temperature of about 85° F. with stirring for a period sufficient to insure complete reaction, normally one to 3 hours.

Such an acid oil, as above, is prepared by treating a Mid-continent neutral oil with successive dumps of oleum and blowing the oil with air to remove sulfur dioxide following removal of the separable sludge after the last dump.

Since I customarily employ the triamylamine sulfonate in oil solution, it is not my practice to isolate it from the reaction mixture. However, as some of the sulfonate normally precipitates I generally add a sufficient amount of kerosene or other suitable solvent, benzene, for example, to bring the precipitated portion into solution.

The rust-inhibiting property of the sulfonate finds wide application. Thus, in addition to being useful in inhibiting rusting in storage tanks, pipe lines, etc., solutions of the sulfonate may be blended with oils of suitable characteristics to provide lubricating compositions which will retard the corrosion of iron and steel surfaces with which they come into contact. The exact amount of the sulfonate employed in the preparation of such compositions depends on the degree of protection required and other factors including the extent to which the sulfonate may be made to dissolve in the particular base oil, the viscosity of the base oil, etc. Highly effective slushing and needle oils can be prepared by blending solutions of the sulfonate with oils conventionally used in slushing and needle oil manufacture. These oils are applied to clean metal surfaces as by spraying, brushing or dipping to protect the surface from corrosion by atmospheric moisture or accidental moisture spray.

Objects or articles susceptible to attack by moisture with resultant corrosion, and which may be treated with oil-base compositions prepared according to my invention include, for example, accurately machined parts such as piston rings, pump plungers, etc., steel castings, which are frequently stored in the open for long periods, idle machinery, storage drums, tools and the like.

The suitability of the triamylamine mahogany sulfonate for rust-inhibiting compositions of various types is demonstrated by subjecting blends containing the sulfonate to a test analogous to ASTM designation D-665-42T. According to my modified test, run at room temperature, a polished mild steel strip is suspended in a beaker fitted with a mechanical stirrer and containing 350 mls. of the test blend. The blend is stirred for 30 minutes after which 50 mls. thereof is removed and 30 mls. of distilled water substituted. Stirring is continued for a given period and the strip then inspected for rust. The test is particularly useful for indicating the suitability of a given sulfonate as a pipe line rust inhibitor. Internal corrosion of product pipe lines is undesirable, inter alia, because of the contamination of distillate with corrosion products and because the consequent restriction of the internal diameter of the pipe decreases the volume of distillate which can be transported therethrough over a given period under a constant pressure.

The appended table compares the effectiveness of triamylamine mahogany sulfonate in the described test with other amine mahogany sulfonates of comparable molecular weight. In the tests of the table, kerosene was employed as the inhibited oil and the triamylamine sulfonate was added to the kerosene as a 5% solution in kerosene and the oil from which it was derived.

It is particularly important to note from the table that in the case of the triamylamine mahogany sulfonate, the test period was 72 hours. Also, it should be observed that except for the second test with naphthenylamine mahogany sulfonate, the triamylamine mahogany sulfonate was present in greatly reduced amount. I have no explanation to make as to why the triamylamine mahogany sulfonate is so much more effective than the other mahogany sulfonates tested.

In product pipe lines, the inhibitor of the invention is used in concentrations of from 1 to 100 parts per million. Pipe lines employed in transporting gasoline are particularly prone to corrode and, accordingly, my invention as applied to pipe lines is especially significant with respect to gasoline pipe lines.

I claim:

1. A petroleum oil distillate to which a rust-inhibiting property has been imparted by the incorporation of 1 to 100 parts per million of triamylamine mahogany sulfonate.

2. Gasoline to which a rust-inhibiting property has been imparted by the incorporation of 1 to 100 parts per million of triamylamine mahogany sulfonate.

3. Kerosene to which a rust-inhibiting property has been imparted by the incorporation of 1 to 100 parts per million of triamylamine mahogany sulfonate.

4. Fuel oil to which a rust-inhibiting property has been imparted by the incorporation of 1 to 100 parts per million of triamylamine mahogany sulfonate.

FRANKLIN M. WATKINS.

REFERENCES CITED

The following references are of record in the file of this patent:

UNITED STATES PATENTS

| Number | Name | Date |
| --- | --- | --- |
| 2,125,305 | Murphy | Aug. 2, 1938 |
| 2,278,163 | De Groote | Mar. 31, 1942 |
| 2,298,640 | Prutton | Oct. 13, 1942 |
| 2,333,206 | Sloan | Nov. 2, 1943 |

Table

| Sulfonate | Molecular Weight | Additive Conc., Lbs./1,000 Bbls.[1] | Rust Rating [2] |
| --- | --- | --- | --- |
| Blank | | | E |
| Dicyclohexylamine mahogany sulfonate [3] | 181 | 100 | C |
| Laurylamine mahogany sulfonate [3] | 185 | 100 | C |
| Naphthenylamine mahogany sulfonate [3] | 379 | 100 | B |
| Do.[3] | 379 | 25 | D |
| Triamylamine mahogany sulfonate [4] | 227 | 25 | B+ |

[1] Expressed on the basis of a concentrate containing 10% sulfonate.
[2] Rust rating:
B+ = up to 5% of surface rusted.
B = up to 25% of surface rusted.
C = 25-50% of surface rusted.
D = 50-75% of surface rusted.
E = 75-100% of surface rusted.
[3] Test period 48 hours.
[4] Test period 72 hours.